United States Patent
Kase et al.

(10) Patent No.: US 9,062,628 B2
(45) Date of Patent: Jun. 23, 2015

(54) FUEL SUPPLY SYSTEM FOR GAS ENGINE

(75) Inventors: Takuo Kase, Wako (JP); Takeshi Fukawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 13/562,833

(22) Filed: Jul. 31, 2012

(65) Prior Publication Data

US 2013/0133623 A1    May 30, 2013

(30) Foreign Application Priority Data

Nov. 29, 2011    (JP) .................................. 2011-260397

(51) Int. Cl.
| | |
|---|---|
| F02B 33/04 | (2006.01) |
| F02B 25/00 | (2006.01) |
| F02M 35/10 | (2006.01) |
| F01L 7/00 | (2006.01) |
| F02M 1/08 | (2006.01) |
| F02M 13/08 | (2006.01) |
| F02M 21/04 | (2006.01) |

(52) U.S. Cl.
CPC . F02M 1/08 (2013.01); Y02T 10/32 (2013.01); F02M 13/08 (2013.01); F02M 21/04 (2013.01)

(58) Field of Classification Search
None
See application file for complete search history.

(56) References Cited

U.S. PATENT DOCUMENTS

| | | | | |
|---|---|---|---|---|
| 4,194,483 | A * | 3/1980 | McChesney et al. | 123/179.9 |
| 4,522,170 | A * | 6/1985 | Lenk et al. | 123/198 DC |
| 4,594,971 | A * | 6/1986 | Borst | 123/73 AD |
| 7,591,251 | B1 * | 9/2009 | Roche et al. | 123/516 |
| 2008/0053413 | A1 * | 3/2008 | Donahue et al. | 123/510 |
| 2009/0229579 | A1 * | 9/2009 | Fujinuma et al. | 123/512 |
| 2009/0308357 | A1 * | 12/2009 | Kono et al. | 123/514 |
| 2011/0023850 | A1 * | 2/2011 | Karlovsky et al. | 123/573 |

FOREIGN PATENT DOCUMENTS

| | | |
|---|---|---|
| JP | 07-103006 | 4/1995 |
| JP | 2007-092612 | 4/2007 |

OTHER PUBLICATIONS

Japanese Office Action for Application No. 2011-260397, dated May 13, 2014; partial English translation included.

* cited by examiner

*Primary Examiner* — Lindsay Low
*Assistant Examiner* — Brian P Monahon
(74) *Attorney, Agent, or Firm* — Rankin, Hill & Clark LLP

(57) ABSTRACT

A fuel supply system includes an intake flow passage communicating with an intake port of a gas engine, a fuel shut-off valve assembly for blocking a fuel supply passage to prevent supply of a gas fuel to a fuel mixer, a vacuum flow passage communicating with a vacuum actuator of the fuel shut-off valve assembly and a crank chamber of the gas engine, and means for holding the vacuum flow passage open when the gas engine starts, such that a vacuum produced in the crank chamber is used to actuate the vacuum actuator for switching the fuel shut-off valve assembly to an open position allowing supply of the gas fuel to the fuel mixer.

2 Claims, 12 Drawing Sheets

FUEL SUPPLY SYSTEM FOR GAS ENGINE

FIELD OF THE INVENTION

The present invention relates to a fuel supply system including an intake flow passage communicating with an intake port of a gas engine and a fuel mixer disposed at the intake flow passage for mixing a gas fuel with an air.

BACKGROUND OF THE INVENTION

A well-known gas engine is started by a self-starter or a recoil starter. As for some gas engine started by a self-starter, a battery for the self-starter is provided for actuating a solenoid valve to allow quick supply of a gas fuel for improving startability of the gas engine. Use of a solenoid valve to allow quick supply of a gas fuel for successfully starting a gas engine is disclosed in, for example, JP-A-7-103006.

JP-A-7-103006 discloses a fuel supply system is provided for quickly supplying a gas fuel to a gas engine. However, this system has a complex structure because the system includes a battery, a self-starter and a solenoid valve, and a control unit for controlling the solenoid valve. Such a complex structure has a high cost and a heavy weight.

A gas engine provided with a recoil starter is started by manually pulling the recoil starter. Thus, a fuel supply system for such a gas engine provided with the recoil starter need not include a self-starter or battery for starting the gas engine. However, the fuel supply system for the gas engine provided with the recoil starter cannot quickly supply a gas fuel to the gas engine by using a solenoid valve as disclosed in JP-A-7-103006.

To address problems regarding the quick supply of the gas fuel, it is well-known in the art that an intake flow passage for introducing a gas fuel into a combustion chamber of a gas engine is provided with a choke valve. This choke valve is designed to be closed to create a high vacuum in the intake flow passage for opening a fuel shut-off valve to allow quick supply of a gas fuel.

A natural gas used as a gas fuel has a narrower flammable range suitable for starting a gas engine than LP Gas or gasoline. It may be troublesome to control the choke valve to precisely control the fuel shut-off valve in correspondence to the narrow flammable range of the natural gas.

SUMMARY OF THE INVENTION

It is an object of the present invention to provide a fuel supply system allowing for quick supply of a gas fuel without using a power source. The system has such a simple structure that the system has a reduced cost and weight. The system is easy to operate because the system does not include a choke valve.

According to one aspect of the present invention, there is provided a fuel supply system for a gas engine having an intake port and a crank chamber, the fuel supply system comprising: an intake flow passage communicating with the intake port of the gas engine; a fuel mixer disposed at the intake flow passage for mixing a gas fuel with an air; a fuel supply passage for supplying the gas fuel to the fuel mixer; a fuel shut-off valve assembly disposed at the fuel supply passage for blocking the fuel supply passage, the fuel shut-off valve assembly including a vacuum actuator for switching the fuel shut-off valve assembly between an open position and a closed position; a vacuum flow passage communicating with the crank chamber and the vacuum actuator of the fuel shut-off valve assembly; and means for holding the vacuum flow passage open when the gas engine starts, such that a vacuum produced in the crank chamber is used to actuate the vacuum actuator for switching the fuel shut-off valve assembly to the open position.

The means holds the vacuum flow passage open when the gas engine starts, such that the vacuum produced in the crank chamber is used to actuate the vacuum actuator for switching the fuel shut-off valve assembly to the open position. The vacuum produced in the crank chamber when the gas engine starts is so great that the vacuum actuator instantaneously switches the fuel shut-off valve assembly to the open position. This allows quick supply of the gas fuel to the gas engine without using a solenoid valve requiring a power source.

Since there is no need to provide the fuel supply with a power source (battery) for actuating a solenoid valve or a control unit for controlling the solenoid valve, the fuel supply system has a simple structure having a reduced cost and weight.

The vacuum produced in the crank chamber when the gas engine starts is used for instantaneously switching the fuel shut-off valve assembly to the open position. This eliminates a need for a choke valve used in the prior art fuel supply system as discussed above. Thus, even when a natural gas of narrow flammable range is used as a gas fuel, it is not required that the choke valve be controlled in correspondence to the narrow flammable range of the natural gas. The lack of need to control the choke valve facilitates operation of the fuel supply system.

Preferably, the means comprises: a sub-vacuum flow passage communicating with the fuel mixer and a connection portion of the vacuum flow passage; and a switchable valve assembly disposed in the vacuum flow passage, the switchable valve assembly being offset from the connection portion of the vacuum flow passage toward the crank chamber, the switchable valve assembly being switchable between an open position opening the vacuum flow passage and a closed position blocking the vacuum flow passage, the switchable valve assembly being held in the open position until a vacuum produced in the fuel mixer reaches a predetermined vacuum, the switchable valve assembly being switched to the closed position by the vacuum produced in the fuel mixer when the vacuum produced in the fuel mixer reaches the predetermined vacuum.

The sub-vacuum flow passage communicates with the fuel mixer and the connection portion of the vacuum flow passage. The switchable valve assembly is offset from the connection portion of the vacuum flow passage toward the crank chamber. The switchable valve assembly is held in the open position until the vacuum produced in the fuel mixer reaches the predetermined vacuum. Thus, the vacuum produced in the crank chamber when the gas engine starts can be used to actuate the vacuum actuator for instantaneously switching the fuel shut-off valve assembly to the open position, thereby allowing quick supply of the gas fuel to the gas engine.

The vacuum in the fuel mixer reaches the predetermined vacuum as the gas engine steadily runs after starting. This predetermined vacuum provides a pressure higher than a pressure provided by the vacuum produced in the crank chamber. As a result, the switchable valve assembly is switched to the closed position under the action of the vacuum in the fuel mixer.

With the switchable valve assembly in the closed position, the fuel mixer communicates with the vacuum actuator of the fuel shut-off valve assembly via the sub-vacuum flow passage and the vacuum flow passage. Thus, the vacuum produced in the fuel mixer can be used to cause the vacuum actuator to hold the fuel shut-off valve assembly in the open position as the engine is in operation.

At the time the gas engine stops running, the switchable valve assembly is held in the closed position under the action of the vacuum produced in the fuel mixer. Then, the vacuum actuator of the fuel shut-off valve assembly communicates with the atmosphere through the fuel mixer. With the vacuum actuator maintained at the atmospheric pressure, thus, the fuel shut-off valve assembly is switched to the closed position.

As for a common gas engine, a volume of a space formed between a throttle valve and an intake valve of the gas engine is smaller than a volume of a crank chamber of the gas engine. A pressure in such a smaller volume of the space between the throttle valve and the intake valve can be instantaneously brought back to the atmospheric pressure. Thus, the pressure in the vacuum actuator of the fuel shut-off valve assembly can be also instantaneously brought back to the atmospheric pressure at the time the gas engine stops running, thereby rapidly switching the fuel shut-off valve assembly to the closed position.

The fuel supply system is adapted to use the vacuum produced in the crank chamber or the fuel mixer to switch the switchable valve assembly between the open position and the closed position. This eliminates a need for a power source (battery) for actuating the switchable valve assembly or a control unit for controlling the switchable valve assembly. Due to lack of the need for such a power source or control unit, the switchable valve assembly is simple in structure. The simple structure of the switchable valve assembly has a reduced weight and cost.

Preferably, the means comprising: a start/stop switch movable between a start position making the gas engine startable and a stop position stopping the gas engine; an opening portion formed in the vacuum flow passage and opened to an atmosphere; and a switchable valve assembly offset from the opening portion toward the crank chamber and connected to the start/stop switch in such a manner as to move together with the start/stop switch, the switchable valve assembly opening the vacuum flow passage and closing the opening portion when the start/stop switch is in the start position, the switchable valve assembly closing the vacuum flow passage and opening the opening portion when the start/stop switch is in the stop position.

The opening portion opened into the atmosphere is formed in the vacuum flow passage. The switchable valve assembly is disposed at the vacuum flow passage and is offset from the opening portion toward the crank chamber. The switchable valve assembly is connected to the start/stop switch in such a manner as to move together with the start/stop switch. The start/stop switch is a manually operable switch as used in a common gas engine.

When the start/stop switch is manually moved to the start position, the switchable valve assembly moves to open the vacuum flow passage and close the opening portion. Thus, the vacuum produced in the crank chamber when the gas engine starts can be used to actuate the vacuum actuator of the fuel shut-off valve assembly for instantaneously switching the fuel shut-off valve assembly to the open position to allow quick supply of the gas fuel to the gas engine.

When the start/stop switch is manually moved to the stop position, the switchable valve assembly moves to close the vacuum flow passage and open the opening portion. Thus, the vacuum actuator of the fuel shut-off valve assembly can be maintained at the atmospheric pressure when the gas engine stops running, thereby switching the fuel shut-off valve assembly to the closed position.

Since the switchable valve assembly is movable together with the manually operable start/stop switch, there is no need for a power source (battery) for actuating the switchable valve assembly or a control unit for controlling the switchable valve assembly. Due to lack of the need for such a power source or a control unit, the switchable valve assembly is simple in structure. Such a simple structure of the assembly has a reduced cost and weight.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENT

A gas engine 11 used with a gas fuel system 30 in a first embodiment of the present invention is discussed below. It is to be noted that the gas engine 11 is described as being used with a generator but may be used with other machines such as a tiller, a snow thrower and a bush-cutting machine.

Figure 1:
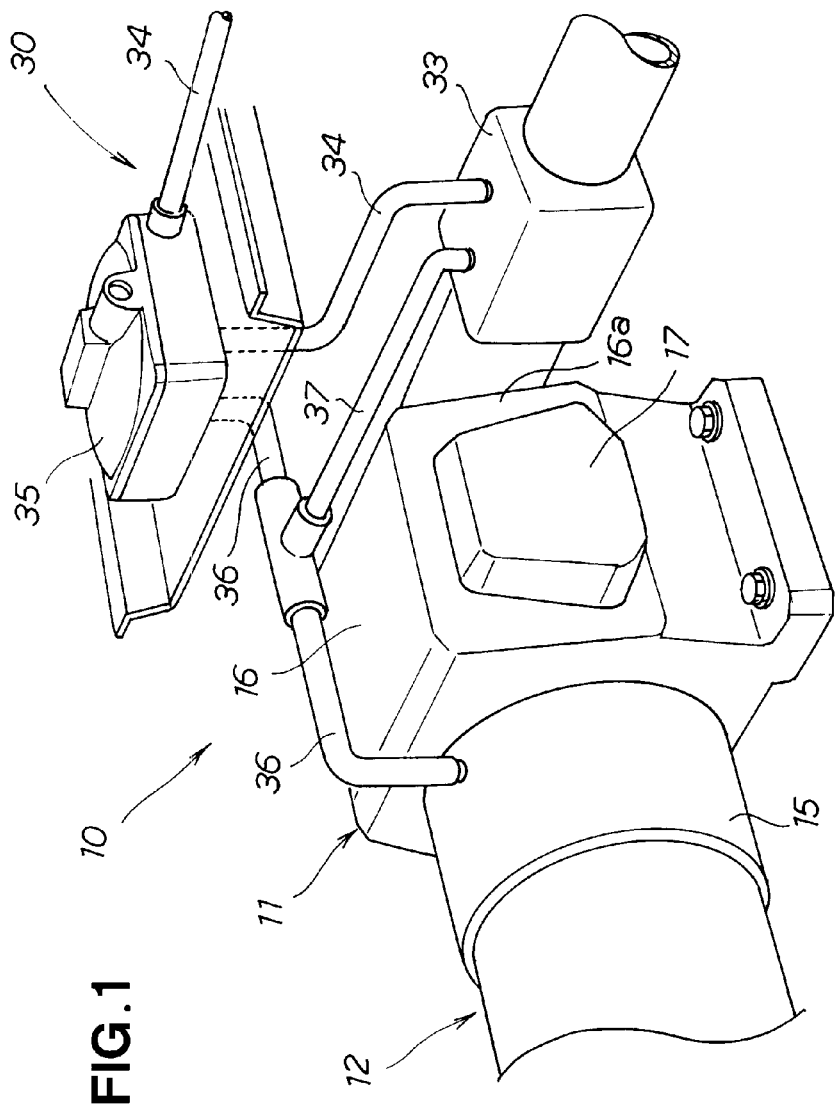
FIG. 1 is a perspective view of a gas engine generator used with a fuel supply system in a first embodiment of the present invention.

As shown in FIG. 1, a gas engine generator 10 includes the gas engine 11 and a generator 12 connected to the gas engine 11. The generator 12 includes a rotor connected to a crankshaft 25 (FIG. 2) of the gas engine 11.

The gas engine 11 includes a crankcase 15 connected to the generator 12, a cylinder block 16 attached to the crankcase 15, and a cylinder head 17 attached to an end portion 16a of the cylinder block 16. The cylinder head 17 defines a combustion chamber 19 (FIG. 2) for receiving a gas fuel supplied from the fuel supply system 30.

Figure 2:
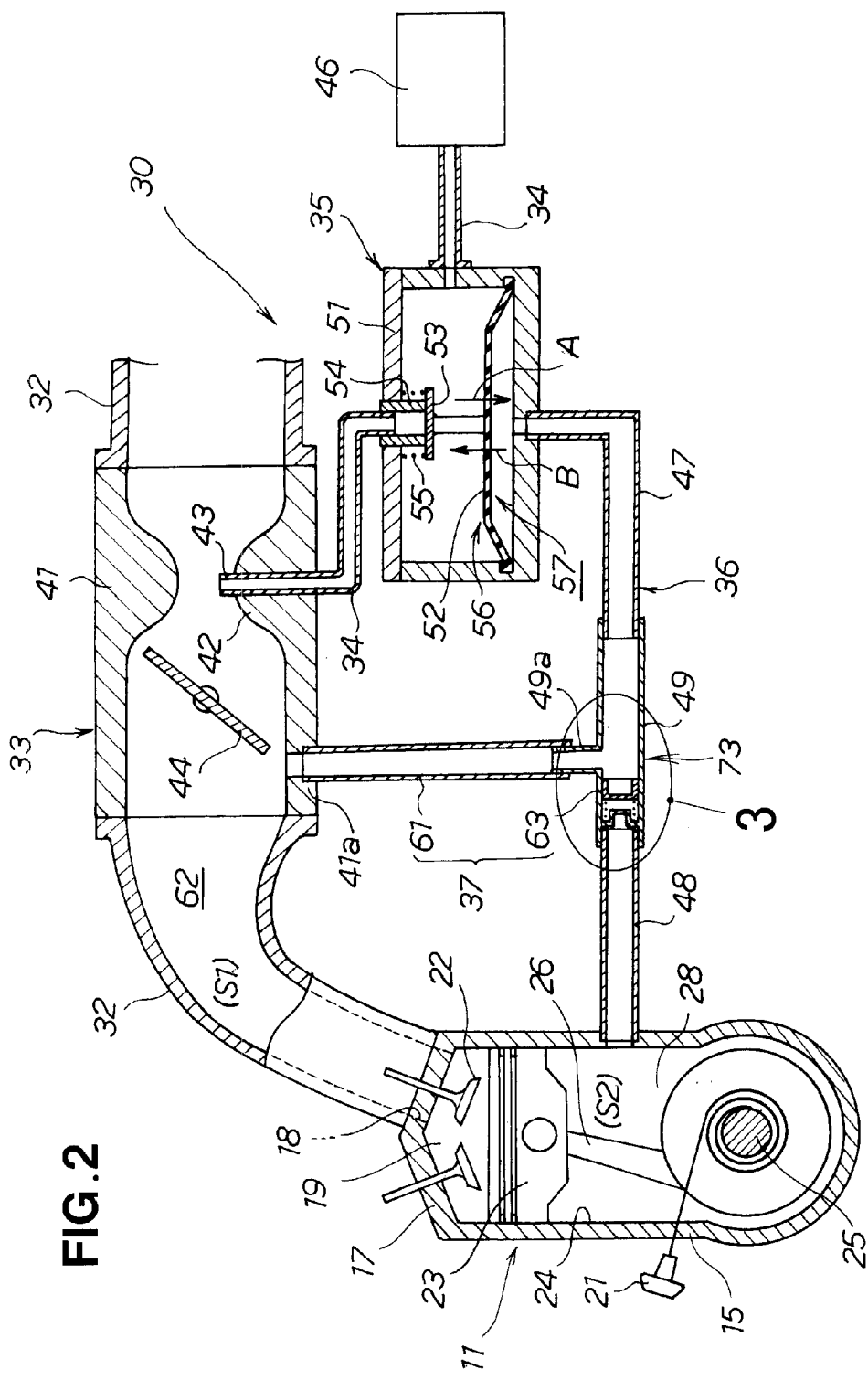
FIG. 2 is a cross-sectional view of a gas engine and the fuel supply system of FIG. 1.

Referring to FIG. 2, the gas engine 11 is designed such that, when a recoil starter 21 is manually pulled with a start/stop switch in a start position, an intake valve 22 of the gas engine 11 is opened to allow a gas fuel to be introduced into the combustion chamber 19 through an intake port 18 of the gas engine 11. The start/stop switch is a well-known switch used in a common gas engine. The start/stop switch is controlled to close (connect) an electric circuit of the gas engine 11 in starting the gas engine 11 or open (disconnect) the circuit in stopping the gas engine 11.

The fuel introduced into the combustion chamber 19 after the recoil starter 21 is pulled burns in the chamber 19 to move a piston 23 down a cylinder 24. Reciprocating movement of the piston 23 along the cylinder block 16 causes a connecting rod 26 to rotate the crankshaft 25. The rotation of the crankshaft 25 rotates the rotor of the generator 12 (FIG. 1) to generate electricity.

During the reciprocating movement of the piston 23 along the cylinder block 16, a vacuum is produced in an intake flow passage 32 (a fuel mixer 33) or a crank chamber 28 defined by the crankcase 15. Within the fuel mixer 33, more specifically, a vacuum is created in accordance with a speed of a gas fuel passing through the intake flow passage 32. When the gas engine runs at a low speed, the speed of the gas fuel is also low, and hence a vacuum in the fuel mixer 33 is small.

The crank chamber 28 has a volume changed by the reciprocating movement of the piston 23. The change in volume of the crank chamber 28 creates a vacuum. In other words, a great vacuum can be created during the reciprocal movement of the piston 23 even when the engine speed is low.

This means that a vacuum produced in the fuel mixer 32 is smaller than a vacuum produced in the crank chamber 28.

The fuel supply system 30 includes the intake flow passage 32 communicating with the intake port 18 of the gas engine 11, and the fuel mixer 33 disposed at the intake flow passage 32.

The fuel supply system 30 further includes a fuel supply passage 34 communicating with the fuel mixer 33, and a fuel shut-off valve assembly 35 disposed at the fuel supply passage 34.

In addition, the fuel supply system 30 includes a vacuum flow passage 36 communicating with the fuel shut-off valve assembly 35 and the crank chamber 28 of the crankcase 15, and means 37 disposed at the vacuum flow passage 36 for holding the vacuum flow passage 36 open when the gas engine 11 starts so as to allow the crank chamber 28 to communicate with the fuel shut-off valve assembly 35.

Through the intake flow passage 32, the intake port 18 of the gas engine 11 communicates with an air cleaner (not shown).

The fuel mixer 33 includes a body 41, a venturi 42 formed on an upstream side of the body 41, and a throttle valve 44 disposed downstream of the venturi 42. The venturi 42 is supplied with a gas fuel from a nozzle 43 defined by the fuel supply passage 34.

As the piston 23 of the gas engine 11 moves down, a vacuum is produced in the venturi 42 to draw an air into the body 41 of the fuel mixer 33. The throttle valve 44 adjusts a flow rate of the air in the body 41 of the fuel mixer 33.

The vacuum produced in the venturi 42 draws a gas fuel from the nozzle 43 of the fuel supply passage 34 into the venturi 42. The gas fuel, which has been introduced into the venturi 42, mixes with the air from the air cleaner to be introduced into the intake port 18.

The fuel supply passage 34 communicates with a fuel tank 46 storing a gas fuel.

The fuel shut-off valve assembly 35 is movable between an open position opening the fuel supply passage 34 to allow the fuel supply passage 34 to supply a gas fuel from the fuel tank 46 to the fuel mixer 33 and a closed position blocking the fuel supply passage 34 to shut off supply of a gas fuel from the fuel tank 46 to the fuel mixer 33.

The fuel shut-off valve assembly 35 includes a body 51, a diaphragm 52 disposed on the body 51, a valve body 53 connected to the diaphragm 52, a valve seat 54 against which the valve body 53 is seated, and a compression spring 55 urging the diaphragm 52.

The diaphragm 52 and the body 51 form a vacuum actuator 56 communicating with the vacuum flow passage 36. The vacuum actuator 56 can be actuated to switch the fuel shut-off valve assembly 35 between the open position and the closed position.

The diaphragm 52 of the vacuum actuator 56 is deformed under action of a force of the compression spring 55 in a direction of an arrow A when a vacuum is produced in a space 57 defined by the vacuum actuator 56. The deformation of the diaphragm 52 in the direction of the arrow A moves the valve body 53 off the valve seat 54 to thereby switch the fuel shut-off valve assembly 35 to the open position opening the fuel supply passage 34 to allow supply of a gas fuel from the gas tank 46 through the fuel supply passage 34 to the fuel mixer 33.

The diaphragm 52 of the vacuum actuator 56 is deformed in a direction of arrow B with an atmospheric pressure in the space 57 of the vacuum actuator 56. The deformation of the diaphragm 52 in the direction of the arrow B moves the valve body 53 into abutment on the valve seat 54 against the force of the compression spring 55 to thereby switch the fuel shut-off valve assembly 35 to the closed position blocking the fuel supply passage 34 to prevent introduction of a gas fuel from the fuel tank 46 into the fuel mixer 33.

The vacuum flow passage 36 communicates with the fuel shut-off valve assembly 36 and the crank chamber 28 of the gas engine 11.

The vacuum flow passage 36 includes a first vacuum flow passage section 47 communicating with the vacuum actuator 56, a second vacuum flow passage section 48 communicating with the crank chamber 28, a fitting 49 communicating with the first and second vacuum passages 47, 48. Provided with the fitting 49 is the aforementioned means 37. The fitting 49 is a common fitting having three ports.

More specifically, the means 37 holds the vacuum flow passage 36 open to allow the crank chamber 28 to communicate with the vacuum actuator 56 when the gas engine 11 is out of operation or starts. With the vacuum flow passage 36 held open, thus, a vacuum produced in the crank chamber 28 when the gas engine 11 starts can be used to actuate the vacuum actuator 56 for switching the fuel shut-off valve assembly 35 to the open position.

Figure 3:
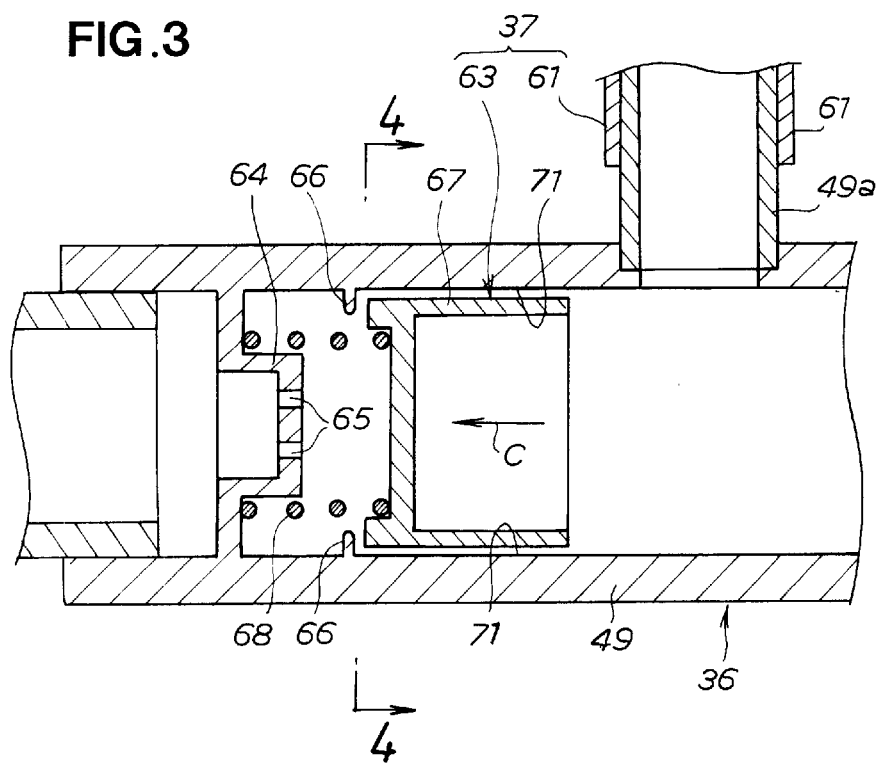
FIG. 3 is an enlarged view of a portion of the fuel supply system indicated by reference numeral 3.

As shown in FIG. 3, means 37 includes a sub-vacuum flow passage 61 through which the vacuum flow passage 36 communicates with the fuel mixer 33, and a switchable valve assembly 63 disposed in the vacuum flow passage 36.

The sub-vacuum flow passage 61 has one end communicating with the body 41 of the fuel mixer 33 and an opposite end communicating with a branch passage (connection portion) 49a of the fitting 49 of the vacuum flow passage 36.

More specifically, the one end of the sub-vacuum flow passage 61 communicates with a communication portion 41a of the body 41 located in a vicinity of the throttle valve 44 on a side of the combustion chamber 19. In other words, the sub-vacuum flow passage 61 communicates with an intake space 62 defined between the throttle valve 44 and the intake valve 22.

The switchable valve assembly 63 is disposed in the fitting 49 of the vacuum flow passage 36 and offset from the branch passage 49a of the fitting 49 toward the crank chamber 28. The switchable valve assembly 63 is switchable between an open position and a closed position. When in the open position, the switchable valve assembly 63 opens the vacuum flow passage 36 to allow the crank chamber 28 to communicate with the vacuum actuator 56 of the fuel shut-off valve assembly 35. When in the closed position, the switchable valve assembly 63 blocks the vacuum flow passage 36.

The fitting 49 and the switchable valve assembly 63 disposed in the fitting 49 form a three-way valve 73.

Figure 4:
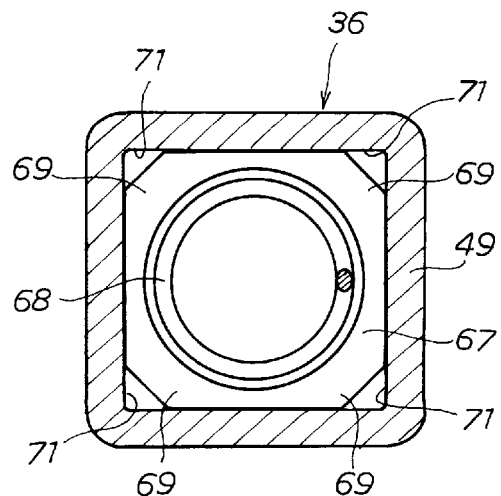
FIG. 4 is a cross-sectional view taken along line 4-4 of FIG. 3.

As shown in FIG. 3 and FIG. 4, the switchable valve assembly 63 includes a partition wall 64 formed in the vacuum flow passage 36 (the fitting 49), a plurality of introducing holes 65 formed through the partition wall 64, a valve seat 66 offset from the partition wall 64 toward the branch passage 49a, a valve body 67 offset from the valve seat 66 toward the branch passage 49a, and a compression spring 68 interposed between the valve body 67 and the partition wall 64.

The valve body 67 has a generally rectangular shape as viewed in front elevation. The valve body 67 includes four beveled corners 69. The beveled corners 69 and the vacuum flow passage 36 jointly define introduction channels 71.

The compression spring 68 forces the valve body 67 away from the valve seat 66 to bring the crank chamber 28 (FIG. 2) of the gas engine 11 into communication with the vacuum actuator 56 (FIG. 2) of the fuel shut-off valve assembly 35 through the introducing holes 65 and the introduction channels 71.

Description will be made to an operation of the switchable valve assembly 63 with reference to FIG. 2, FIG. 3 and FIG. 5.

Figure 5:
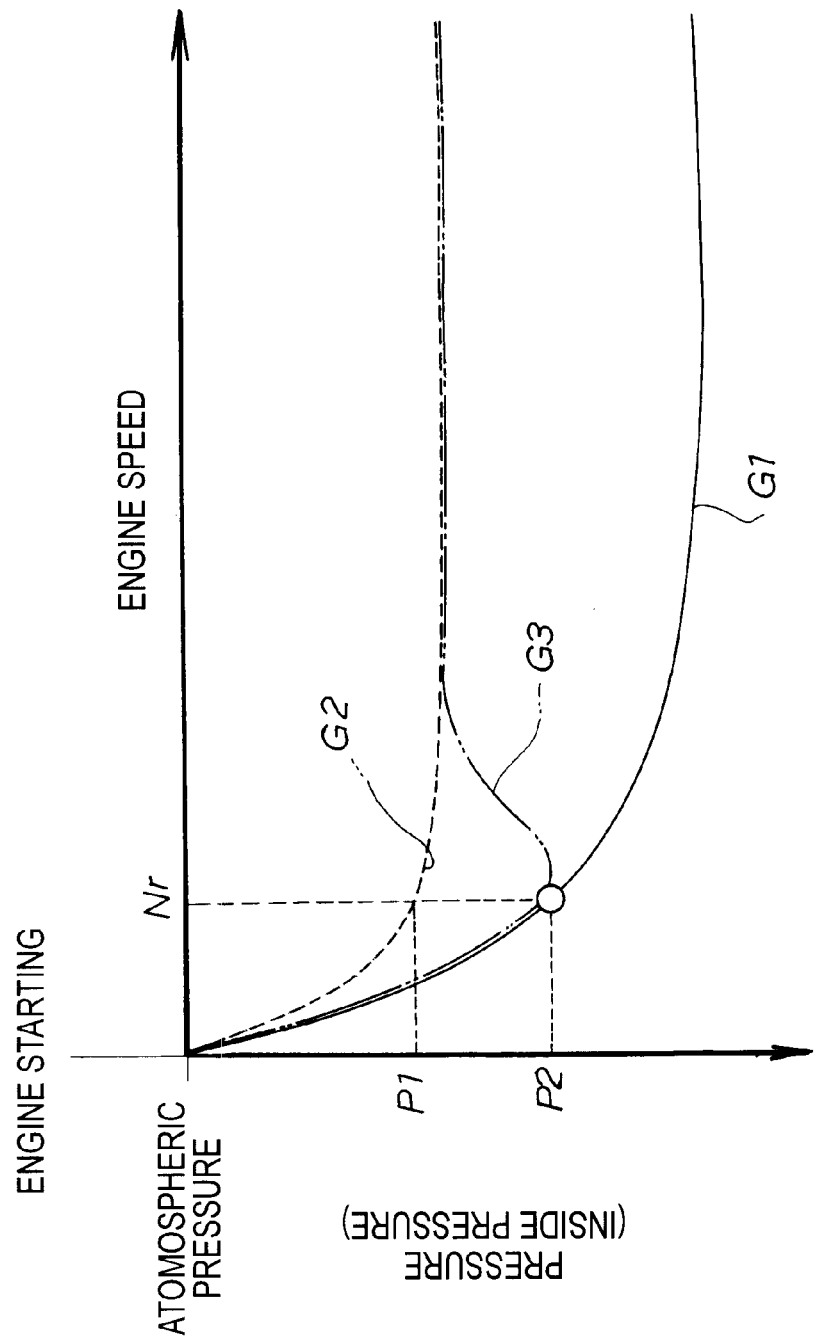
FIG. 5 is a graph showing a relationship between a vacuum and a speed of the gas engine.

FIG. 5 shows a graph indicating a relation between a vacuum and a speed of the gas engine 11. In the graph, a vertical axis shows a pressure (vacuum) and a horizontal axis shows a speed of the gas engine 11.

A curve G1 shows a pressure in the crank chamber 28, a curve G2 shows a pressure in the combustion chamber 19 (or the fuel mixer 33), and a curve G3 shows a pressure in the fuel shut-off valve assembly 35 (more specifically, the vacuum actuator 56).

The pressure G1 in the crank chamber 28, the pressure G2 in the fuel mixer 33, and the pressure G3 in the fuel shut-off valve assembly 35 (or the vacuum actuator 56) will be hereinafter referred to as "inside pressure G1 of the crank chamber 28", "inside pressure G2 of the fuel mixer 33" and "inside pressure G3 of the vacuum actuator 56", respectively.

When the gas engine 11 is out of operation, the engine speed is zero. The inside pressure G1 of the crank chamber 28 and the inside pressure G2 of the fuel mixer 33 are maintained at an atmospheric pressure. Therefore, the valve body 67 of the switchable valve assembly 63 is held spaced from the valve seat 66 by a force of the compression spring 68.

As a result, the crank chamber 28 and the fuel mixer 33 communicate with the vacuum actuator 56 of the fuel shut-off valve assembly 35, such that the inside pressure G3 of the vacuum actuator 56 is maintained at the atmospheric pressure.

When the gas engine 11 starts to increase the engine speed, the inside pressure G1 of the crank chamber 28 and the inside pressure G2 of the fuel mixer 33 becomes vacuums.

It is noted that a vacuum produced in the fuel mixer 33 is typically smaller than a vacuum produced in the crank chamber 28 as the piston 23 moves down. That is, the vacuum G2 of the fuel mixer 33<the vacuum G1 of the crank chamber 28.

It is also noted that a difference between the inside pressure G2 of the fuel mixer 33 and the inside pressure G1 of the crank chamber 28 is small before the engine speed reaches an engine speed Nr. Thus, the valve body 67 of the switchable valve assembly 63 is held spaced from the valve seat 66 by the force of the compression spring 68, such that the crank chamber 28 is in communication with the vacuum actuator 56. As a result, the inside pressure G3 of the vacuum actuator 56 becomes the same vacuum as the inside pressure G1 of the crank chamber 28. Accordingly, when the gas engine 11 starts, the greater inside pressure G1 of the crank chamber 28 is used to actuate the vacuum actuator 56 for instantaneously switching the fuel shut-off valve assembly 35 to the open position. This instantaneous switching of the fuel shut-off valve assembly 35 to the open position allows rapid supply of a gas fuel to the combustion chamber 19.

After the gas engine 11 starts, the gas engine 11 is in operation and the speed of the gas engine 11 reaches the engine speed Nr at which the inside pressure G2 of the fuel mixer 33 becomes a predetermined vacuum P1 while the inside pressure G1 of the crank chamber 28 becomes a vacuum P2. Since a difference between the predetermined vacuum P1 and the vacuum P2 is great, the valve body 67 is moved in a direction of an arrow C against the force of the compression spring 68, such that the valve body 67 abuts on the valve seat 66 to switch the switchable valve assembly 63 to the closed position blocking the vacuum flow passage 36 to prevent communication between the crank chamber 28 and the vacuum actuator 56. Meantime, the vacuum actuator 56 is in communication with the fuel mixer 33. As a result, the inside pressure G3 of the vacuum actuator 56 becomes the predetermined vacuum P1 which is the same as the inside pressure G2 of the fuel mixer 33. The predetermined vacuum P1 is great enough to hold the fuel shut-off valve assembly 35 in the open position.

Descriptions will be made as to operations of the switchable valve assembly 63 with reference to FIG. 5 to FIG. 8B.

Figure 6A:
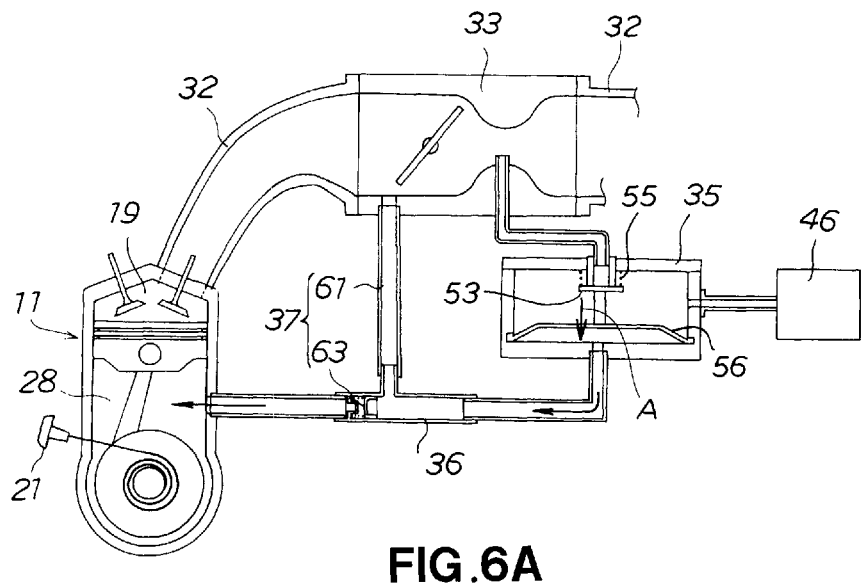
FIG. 6A is a view showing operations of a switchable valve assembly and a fuel shut-off valve assembly of the fuel supply system when the gas engine starts.
Figure 6B:
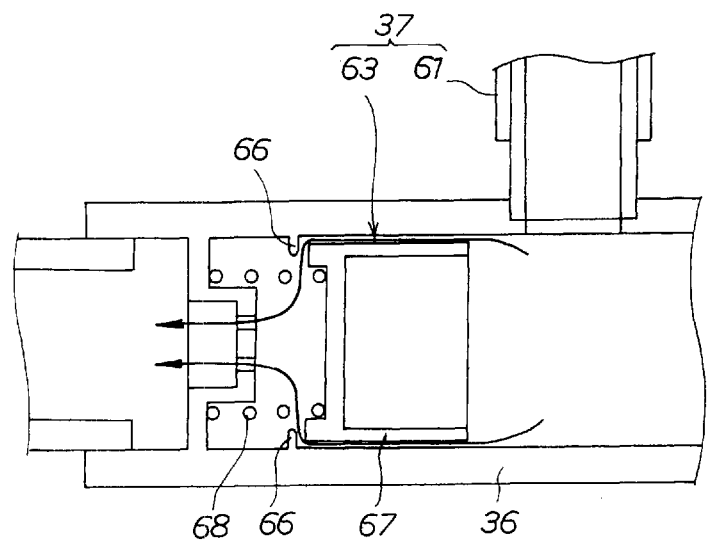
FIG. 6B is a view showing the operation of the switchable valve assembly when the gas engine starts.

First, operations of the switchable valve assembly 63 and the fuel shut-off valve assembly 35 when the gas engine 11 starts will be described with reference to FIG. 5, FIG. 6A and FIG. 6B. Manually pulling the recoil starter 21 (FIG. 6A) with the start/stop switch in the start position starts the gas engine 11. At the time the gas engine 11 starts, a difference between the inside pressure G2 of the fuel mixer 33 and the inside pressure G1 of the crank chamber 28 is small, as shown in FIG. 5. Thus, the switchable valve assembly 63 is held in the open position opening the vacuum flow passage 36, that is, the force of the compression spring 68 holds the valve body 67 spaced from the valve seat 66, as shown in FIG. 6B.

Since the switchable valve assembly 63 (FIG. 6A) is held in the open position opening the vacuum flow passage 36, the crank chamber 38 communicates with the vacuum actuator 56 of the fuel shut-off valve assembly 35 via the vacuum flow passage 36. Thus, a great vacuum produced in the crank chamber 28 (i.e., the inside pressure G1 of the crank chamber 28) is applied to the vacuum actuator 56 of the fuel shut-off valve assembly 35 to move the valve body 53 of the fuel shut-off valve assembly 35 in a direction of an arrow A under action of a force of the compression spring 55, as shown in FIG. 6A, such that the fuel shut-off valve assembly 35 is switched to the open position.

Accordingly, when the gas engine 11 starts, the great vacuum produced in the crank chamber 28 is used so as to instantaneously switch the fuel shut-off valve assembly 35 to the open position opening the fuel supply passage 34, such that a gas fuel in the fuel tank 46 is rapidly supplied through the fuel supply passage 34 and the fuel mixer 33 into the combustion chamber 19. The rapid supply of the gas fuel to the combustion chamber 19 achieves preferable supply of the gas fuel necessary for ignition within the combustion chamber 19, whereby the gas engine 11 can smoothly start to operate.

The vacuum produced in the crank chamber 28 when the gas engine 11 starts is used so as to instantaneously switch the fuel shut-off valve assembly 35 to the open position. This eliminates a need for a choke valve used in the prior art fuel supply system as discussed above. Thus, even when a natural gas of narrow flammable range is used as a gas fuel, it is not required that the choke valve be controlled in correspondence to the narrow flammable range of the natural gas. The lack of need to control the choke valve facilitates operation of the fuel supply system.

Figure 7A:
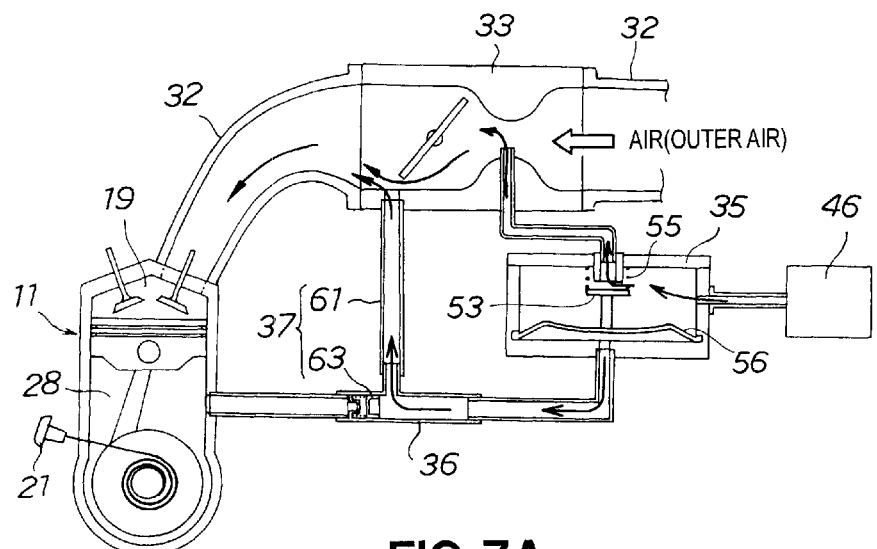
FIG. 7A is a view showing operations of the switchable valve assembly and the fuel shut-off valve assembly when the gas engine runs.
Figure 7B:
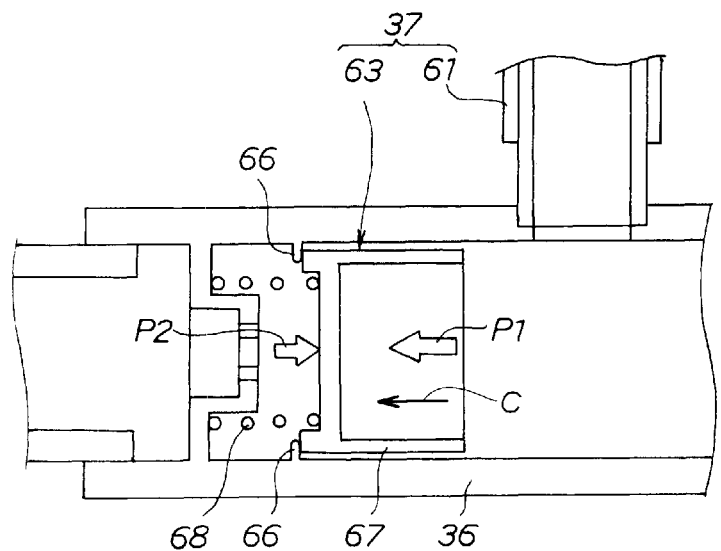
FIG. 7B is a view showing the operation of the switchable valve assembly when the gas engine runs.

Second, operations of the switchable valve assembly 63 and the fuel shut-off valve assembly 35 when the gas engine 11 is in operation will be described with reference to FIG. 5, FIG. 7A and FIG. 7B.

When the gas engine 11 (FIG. 7A) runs steadily after starting, the inside pressure G2 of the fuel mixer 33 reaches the predetermined vacuum P1. The difference between the predetermined vacuum P1 of the fuel mixer 33 and the vacuum P2 of the crank chamber 28 is great, as discussed above, as shown in FIG. 5. This great difference between the predetermined vacuum P1 and the vacuum P2 moves the valve body 67 in a direction of an arrow C against the force of the compression spring 68, as shown in FIG. 7B, such that the valve body 67 abuts on the valve seat 66 to switch the switchable valve assembly 63 to the closed position blocking the vacuum flow passage 36 to prevent communication between the crank chamber 28 and the vacuum actuator 56 of the fuel shut-off valve assembly 35.

Then, the vacuum produced in the fuel mixer 33 (the inside pressure G2 of the fuel mixer 33) is applied to the vacuum actuator 56 of the fuel shut-off valve assembly 35. Since the inside pressure G2 of the fuel mixer 33 has reached the relatively greater predetermined vacuum P1 as the gas engine 11 is in operation, the vacuum actuator 56 subjected to the predetermined vacuum P1 holds the fuel shut-off valve assembly 35 in the open position, as shown in FIG. 7A. Thus, the gas fuel is constantly supplied to the combustion chamber 19 to allow smooth operation of the gas engine 11.

Next, operations of the switchable valve assembly 63 and the fuel shut-off valve assembly 35 when the gas engine 11 stops running will be described with reference to FIG. 5, FIG. 8A and FIG. 8B.

Manually moving the start/stop switch to the stop position to switch off the electric circuit of the gas engine 11 stops operation of the gas engine 11. At the time the gas engine 10 stops running, the inside pressure G2 of the fuel mixer 33 still remains the predetermined vacuum P1. As a result, the switchable valve assembly 63 is held in the closed position, as shown in FIG. 8B.

Figure 8A:
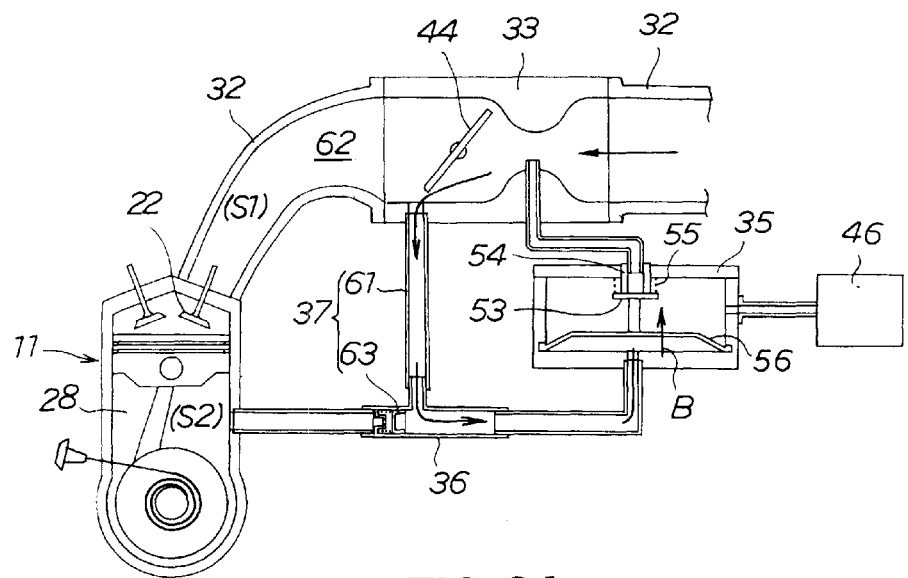
FIG. 8A is a view showing operations of the switchable valve assembly and the fuel shut-off valve assembly when the gas engine stops running.
Figure 8B:
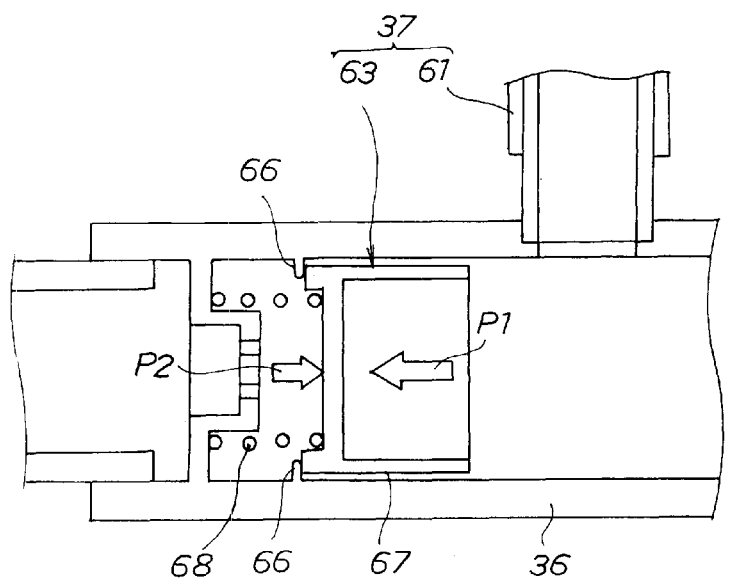
FIG. 8B is a view showing the operation of the switchable valve assembly when the gas engine stops running.

Since the switchable valve assembly 63 is held in the closed position, the vacuum actuator 56 of the fuel shut-off valve assembly 35 communicates with the atmosphere via the fuel mixer 33 and the air cleaner, as shown in FIG. 8A, such that the atmospheric pressure in the vacuum actuator 56 deforms the diaphragm 52 in a direction of an arrow B against the force of the compression spring 55. As a result, the valve body 53 abuts on the valve seat 54 to switch the fuel shut-off valve assembly 35 to the closed position.

The intake space 62 formed between the throttle valve 44 and the intake valve 22 has a volume 51 smaller than a volume S2 of the crank chamber 28. That is, S1<S2.

Due to the smaller volume 51 of the intake space 62, a pressure in the intake space 62 can be instantaneously brought back to the atmospheric pressure. Since the intake space 62 communicates with the vacuum actuator 56 of the fuel shut-off valve assembly 35 via the sub-vacuum flow passage 61, the inside pressure G3 of the vacuum actuator 56 can be instantaneously back brought to the atmospheric pressure as the gas engine 11 stops running, thereby rapidly switching the fuel shut-off valve assembly 35 to the closed position. It is thus becomes possible to prevent introduction of a gas fuel into the fuel mixer 33 through the fuel shut-off valve assembly 35 immediately after the gas engine 11 stops running.

As discussed in relation to FIG. 6A to FIG. 8B, the fuel supply system 30 is adapted to use the vacuum produced in the crank chamber 28 or the fuel mixer 33 to switch the switchable valve assembly 63 between the open position and the closed position. This eliminates a need for a power source (battery) for actuating the switchable valve assembly 63 or a control unit for controlling the switchable valve assembly 63. Due to lack of the need for such a power source or control unit, the switchable valve assembly 63 is simple in structure. The simple structure of the switchable valve assembly 63 has a reduced weight and cost.

A fuel supply system 80 in the second embodiment of the present invention will be described with reference to FIG. 9 to FIG. 11. Elements of the fuel supply system 80 corresponding to those of the fuel supply system 30 will be designated by the same reference numerals and their descriptions are omitted.

Figure 9:
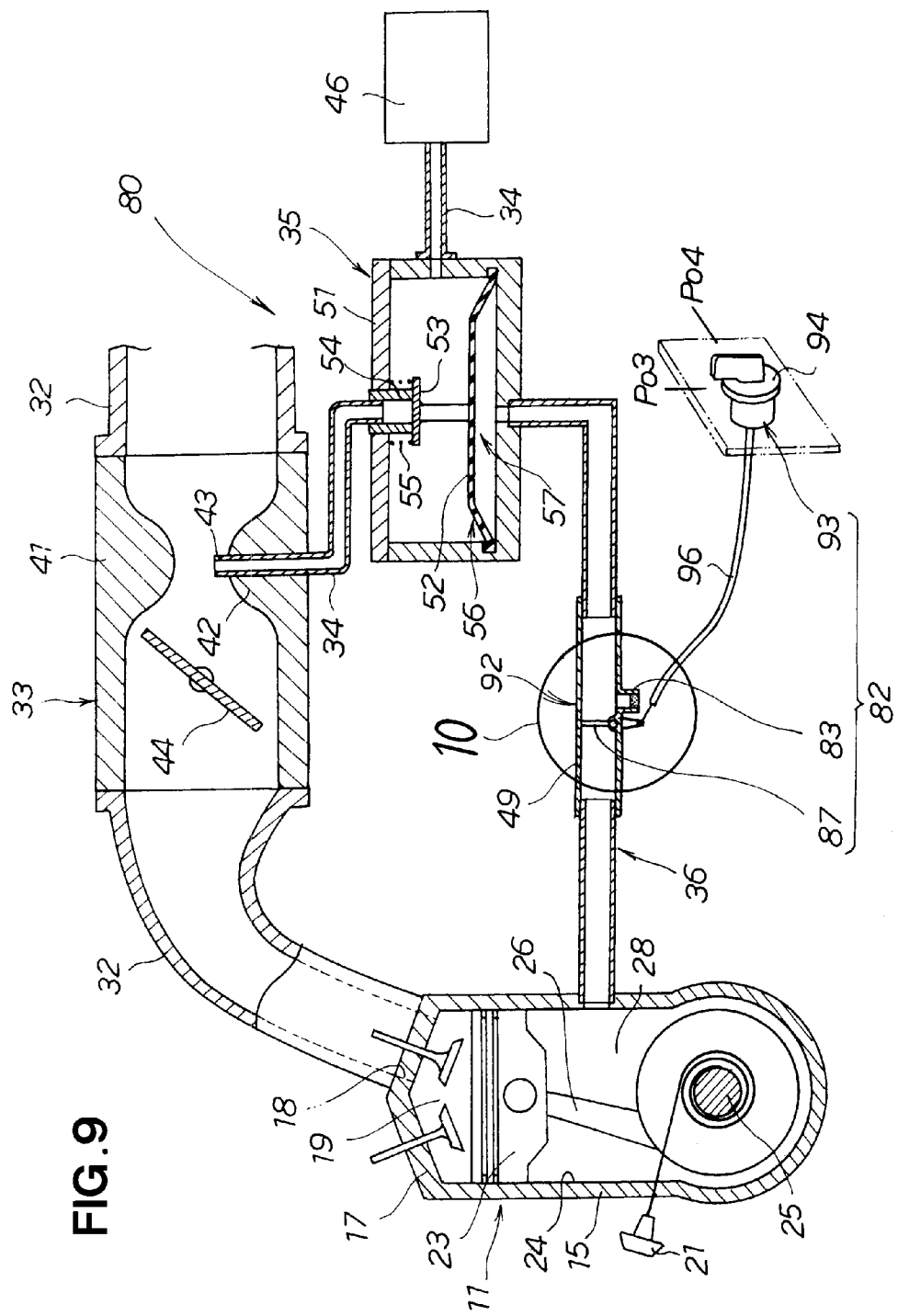
FIG. 9 is a cross-sectional view of a gas engine and a fuel supply system in a second embodiment of the present invention.

The fuel supply system 80 is the same as the fuel supply system 30 except that the fuel supply system 80 includes means 82 in place of the means 37, as shown in FIG. 9.

The means 80 includes an opening portion 83 formed in the vacuum flow passage 36 and a switchable valve assembly 87 offset from the opening portion 83 toward the crank chamber 28, and a control assembly 93 for controlling switching of the switchable valve assembly 87 between an open position and a closed position.

Figure 10:
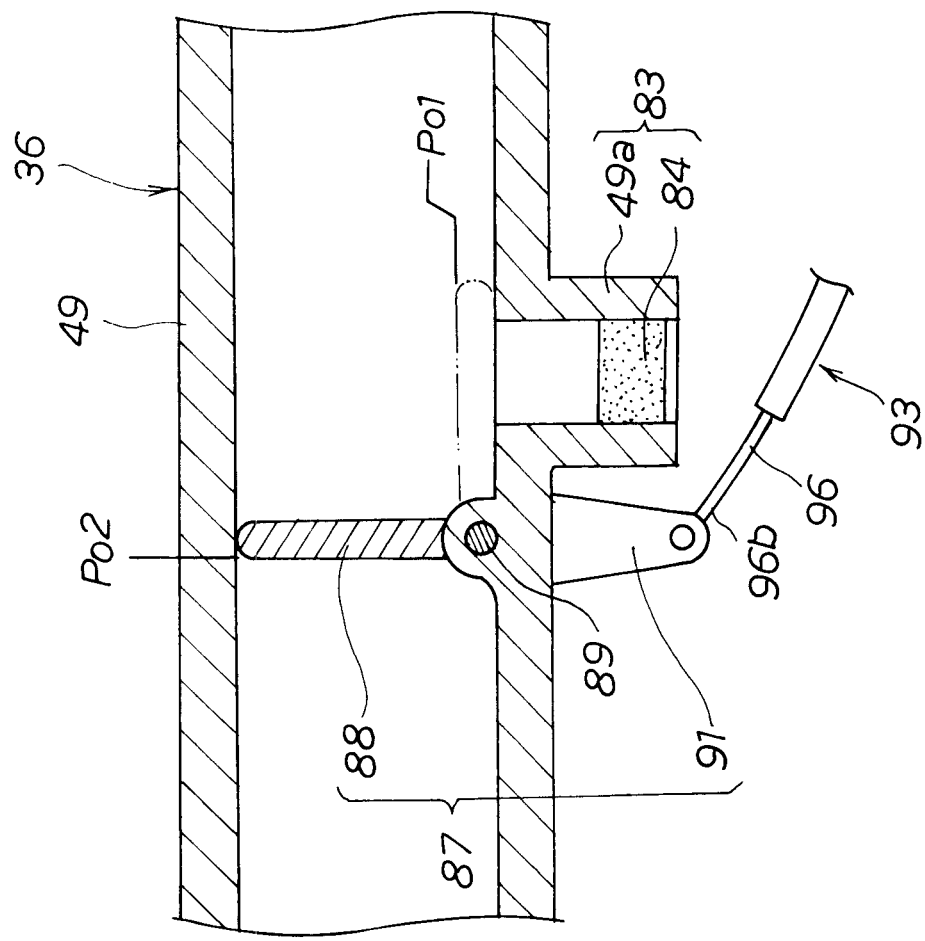
FIG. 10 is an enlarged view of a portion of the gas engine system of FIG. 9, which portion is indicated by reference numeral 10 in FIG. 9.

As shown in FIG. 10, the opening portion 83 includes a branch passage 49a opened into the atmosphere and branching off from the vacuum flow passage 36. The opening portion 83 also includes a filter 84 disposed within the branch passage 49a for purifying an outer air flowing through the branch passage 49a.

As shown in FIG. 9, the switchable valve assembly 87 is connected via a control cable 96 to a gas engine start/stop switch 94 in such a manner as to move together with the switch 94.

As shown in FIG. 10, the switchable valve assembly 87 includes a valve plate 88 pivotably supported on a support shaft 89 within the vacuum flow passage 36 (the fitting 49), and an operational lever 91 disposed on the support shaft 89.

When the switchable valve assembly 87 is in the open position, the valve plate 88 is in a vacuum opening position Po 1 in which the vacuum flow passage 36 is open and the branch passage 49a is closed.

When the switchable valve assembly 87 is in the closed position, the valve plate 88 is in an atmosphere opening position Po 2 in which the vacuum flow passage 36 is closed and the branch passage 49a is open.

The switchable valve assembly 87 and the fitting 49 form a three-way valve 92.

Figure 11:
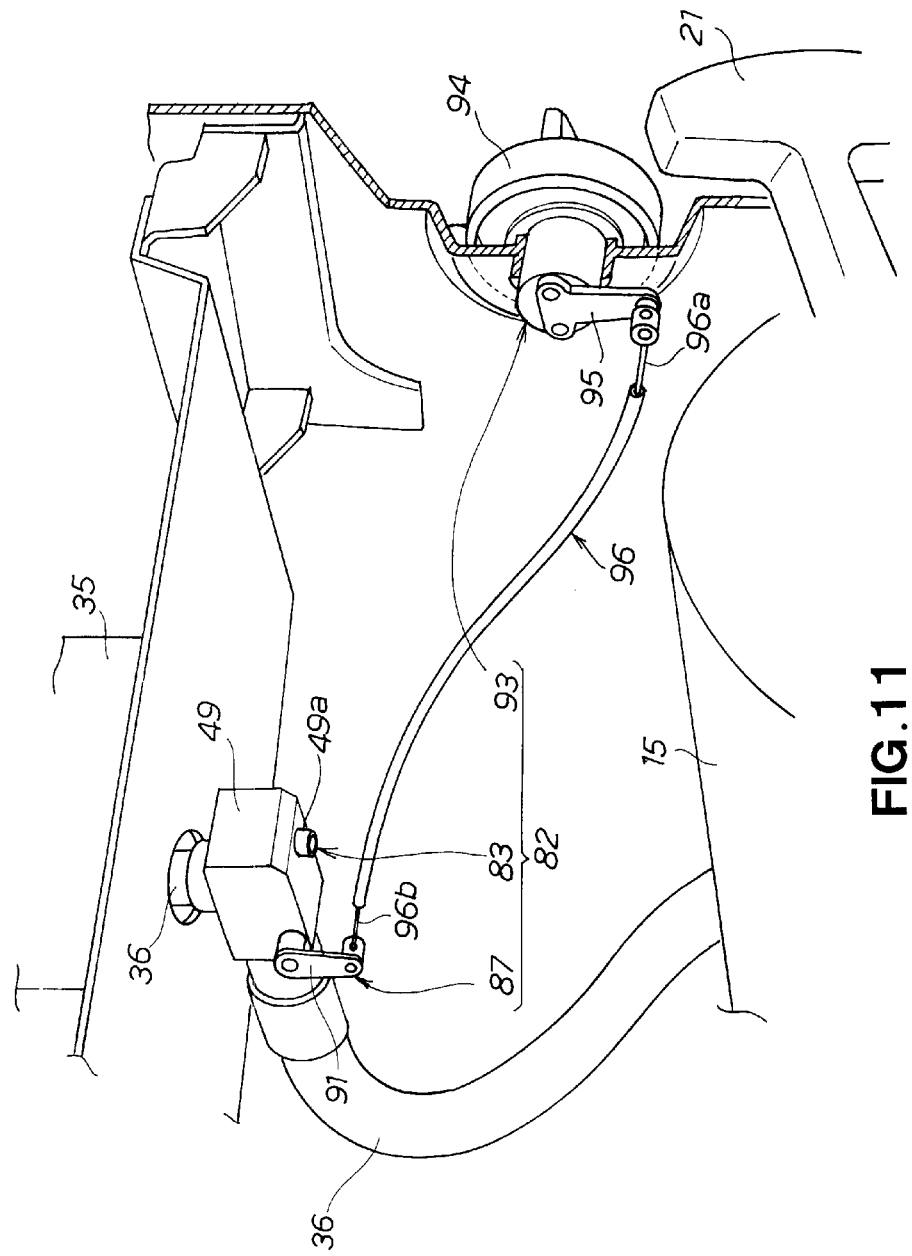
FIG. 11 is a perspective view of means for opening/closing a vacuum flow passage in the fuel supply system in the second embodiment of the present invention.

As shown in FIG. 9 and FIG. 11, the control assembly 93 includes the start/stop switch 94, a mounting bracket 95 attached to the start/stop switch 94, and the control cable 96 having one end portion 96a connected to the mounting bracket 95 and an opposite end portion 96b connected to the operational lever 91.

With the start/stop switch 94 in a stop position Po 4, the valve plate 88 is in the atmosphere opening position Po 2 closing the vacuum flow passage 36 and opening the branch passage 49a.

When the start/stop switch 94 is turned to a start position Po 3, the control cable 96 is pushed to control the operational lever 91 such that the valve plate 88 pivots to the vacuum opening position Po 1 (FIG. 10) opening the vacuum flow passage 36 and closing the branch passage 49a.

When the start/stop switch 94 is turned from the start position Po 3 back to the stop position Po 4, the control cable 96 is pulled to control the operational lever 91 such that the valve plate 88 pivots back to the atmosphere opening position Po 2 closing the vacuum flow passage 36 and opening the branch passage 49a. The start/stop switch 94 is an existing switch as used in a common gas engine.

When in the start position Po 3, the start/stop switch 94 switches on an electric circuit of the gas engine 11 to make the gas engine 11 startable. When in the stop position Po 4, the start/stop switch 94 switches off the electric circuit to stop operation of the gas engine 11.

To start the gas engine 11, therefore, the start/stop switch 94 is turned to the start position Po 3 to switch on the electric circuit of the gas engine 11 as well as to control the operational lever 91 by means of the control cable 96 in such a manner that the valve plate 88 pivots to the vacuum opening position Po 1 opening the vacuum flow passage 36 and closing the branch passage 49a.

To stop the gas engine 11, on the other hand, the start/stop switch 94 is turned back to the stop position Po 4 to switch off the electric circuit of the gas engine 11 as well as to control the operational lever 91 by means of the control cable 96 in such manner that the valve plate 88 pivots back to the atmosphere position Po 2 closing the vacuum flow passage 36 and opening the branch passage 49a.

Operations of the switchable valve assembly 63 and the fuel shut-off valve assembly 35 will be described with reference to FIG. 12A to FIG. 13B.

First, operations of the switchable valve assembly 63 and the fuel shut-off valve assembly 35 when the gas engine 11 is out of operation will be described with reference to FIG. 12A and FIG. 12B.

Figure 12A:
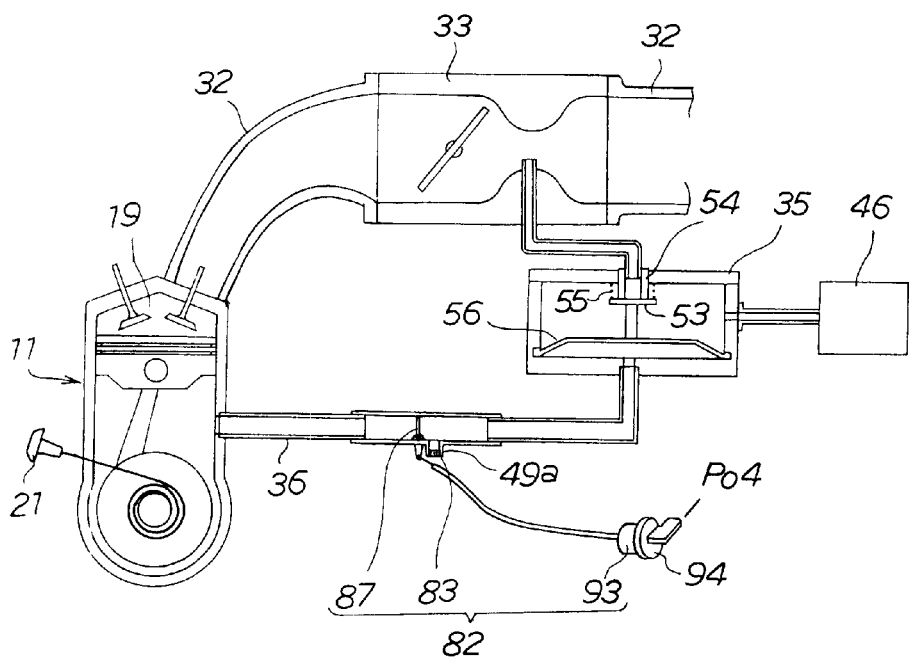
FIG. 12A is a view showing operations of a switchable valve assembly and a fuel shut-off valve assembly of the fuel supply system when the gas engine is out of operation.
Figure 12B:
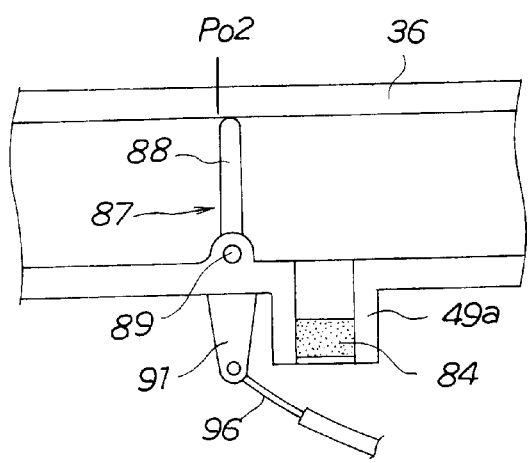
FIG. 12B is a view showing the operation of the switchable valve assembly when the gas engine is out of operation.

As shown in FIG. 12A and FIG. 12B, the start/stop switch 94 is held in the stop position Po 4. Thus, the electric circuit of the gas engine 11 is held in an off state, and the valve plate 88 of the switchable valve assembly 63 is held in the atmosphere opening position Po 2 to hold the vacuum flow passage 36 closed and the branch passage 49a open.

With the valve plate 88 held in the atmosphere opening position Po 2, the vacuum actuator 65 of the fuel shut-off valve assembly 35 communicates with the atmosphere via the branch passage 49a, such that the inside pressure G3 of the vacuum actuator 56 is maintained at an atmospheric pressure to hold the fuel shut-off valve assembly 35 closed for preventing a gas fuel in the fuel tank 46 from being introduced into the fuel mixer 33 through the fuel supply passage 34.

Second, operations of the switchable valve assembly 87 and the fuel shut-off valve assembly 35 when the gas engine 11 starts and is in operation will be described with reference to FIG. 13A and FIG. 13B.

Figure 13A:
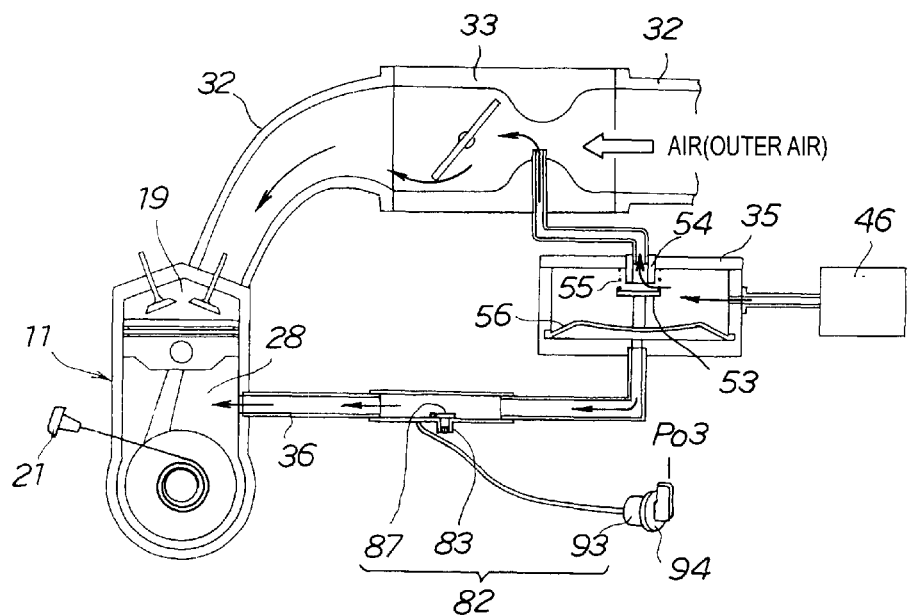
FIG. 13A is a view showing operations of the switchable valve assembly and the fuel shut-off valve assembly when the gas engine starts and runs.
Figure 13B:
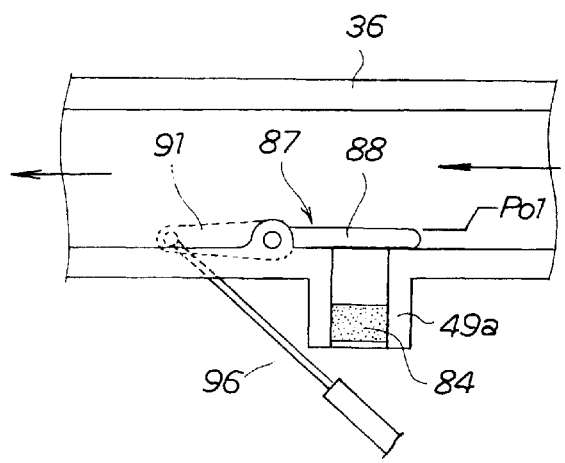
FIG. 13B is a view showing the operation of the switchable valve assembly when the gas engine starts and runs.

As shown in FIG. 13A and FIG. 13B, the start/stop switch 94 is turned to the start position Po 3 to switch on the electric circuit of the gas engine 11 and control the operational lever 91 by means of the control cable 96 in such a manner that the valve plate 88 pivots to the vacuum opening position Po 1 opening the vacuum flow passage 36 and closing the branch passage 49a.

Then, the recoil starter 21 is manually pulled, whereupon a great vacuum produced in the crank chamber 28 (the inside pressure G1 of the crank chamber 28) is applied to the vacuum actuator 56 to instantaneously switch the fuel shut-off valve assembly 35 to the open position, such that a gas fuel is rapidly supplied to the fuel mixer 33 and then the combustion chamber 19. As a result, the gas engine 11 smoothly starts.

The vacuum flow passage 36 is held open and the branch passage 49a is held closed after the gas engine 11 starts, such that the fuel shut-off valve assembly 35 is held in the open position allowing supply of a gas fuel to the combustion chamber 19. As a result, the gas engine 11 smoothly runs.

Since the vacuum produced in the crank chamber 28 when the gas engine 11 starts is used to instantaneously switch the fuel shut-off valve assembly 35 to the open position, therefore, there is no need for a choke valve. Thus, even when the gas engine 11 uses a natural gas having a narrow flammable range, no operation is required to control a choke valve in correspondence to the narrow flammable range of the natural gas. The lack of need to control the choke valve facilitates operation of the gas engine 11.

Next, operations of the switchable valve assembly 87 and the fuel shut-off valve assembly 35 when the gas engine 11 stops running will be described with reference to FIG. 12A and FIG. 12B.

As shown in FIG. 12A and FIG. 12B, the start/stop switch 94 is turned back to the stop position Po 4 as the gas engine 11 runs. This turning of the start/stop switch 94 to the stop position Po 4 switches off the electric circuit of the gas engine 11 to stop the gas engine 11, while controlling the operational lever 91 by means of the control cable 96 in such a manner that the valve plate 88 pivots back to the atmosphere opening position Po 2 closing the vacuum flow passage 36 and opening the branch passage 49a. Since the valve plate 88 is in the atmosphere opening position Po 2, the vacuum flow passage 36 comes into communication with the atmosphere via the branch passage 49a.

As a result, the vacuum actuator 56 of the fuel shut-off valve assembly 35 communicates with the atmosphere via the vacuum flow passage 36 and the branch passage 49a, such that the inside pressure G3 of the vacuum actuator 56 becomes atmospheric pressure to thereby switch the fuel shut-off valve assembly 35 to the closed position.

Since the switchable valve assembly 87 is movable together with the start/stop switch 94, the inside pressure G3 of the vacuum actuator 56 of the fuel shut-off valve assembly 35 can be instantaneously bought back to the atmospheric pressure by the switchable valve assembly 87 to instantaneously switch the fuel shut-off valve assembly 35 to the closed position immediately after operation of the gas engine 11 is stopped by the switch 94.

It is therefore possible to prevent a gas fuel from being introduced through the fuel supply passage 34 into the fuel mixer 33 immediately after the gas engine 11 stops running.

Since the switchable valve assembly 87 is movable together with the manually operable start/stop switch 94, as discussed in relation to FIG. 12A to FIG. 13B, there is no need for a power source (battery) for actuating the switchable valve assembly 87 or a control unit for controlling the switchable valve assembly 87. Due to lack of the need for such a power source or a control unit, the switchable valve assembly 87 is simple in structure. Such a simple structure of the assembly 87 has a reduced cost and weight.

It is noted that the structure or configuration of the gas engine 11 is not limited to that discussed in the foregoing embodiments of the present invention but may be modified without departing the spirit and scope of the present invention. Additionally, the structure or configuration of the generator 12, the intake flow passage 32, the fuel mixer 33, the fuel supply passage 34, the fuel shut-off valve assembly 35, the vacuum flow passage 36, and the means 37, 82 may be modified without departing from the spirit and scope of the invention.

The present invention is applicable to a system including an intake flow passage communicating with an intake port of a gas engine, and a fuel mixer disposed at the intake flow passage for mixing a gas fuel with an air.

Obviously, various minor changes and modifications of the present invention are possible in light of the above teaching. It is therefore to be understood that within the scope of the appended claims the invention may be practiced otherwise than as specifically described.

What is claimed is:

1. A fuel supply system for a gas engine having an intake port and a crank chamber, the fuel supply system comprising:
   an intake flow passage communicating with the intake port of the gas engine;
   a fuel mixer disposed at the intake flow passage for mixing a gas fuel with an air;
   a fuel supply passage for supplying the gas fuel to the fuel mixer;
   a fuel shut-off valve assembly disposed at the fuel supply passage, the fuel shut-off valve assembly including a vacuum actuator for switching the fuel shut-off valve assembly between an open position opening the fuel supply passage and a closed position blocking the fuel supply passage;
   a vacuum flow passage communicating with the crank chamber and the vacuum actuator of the fuel shut-off valve assembly,
   a sub-vacuum flow passage communicating with the fuel mixer and a connection portion of the vacuum flow passage; and
   a switchable valve assembly disposed in the vacuum flow passage between the crank chamber and the connection portion, the switchable valve assembly being switchable between an open position opening the vacuum flow passage and allowing communication between the crank chamber and the vacuum actuator, and a closed position blocking the vacuum flow passage and preventing communication between the crank chamber and the vacuum actuator,
   wherein the vacuum actuator communicates with the fuel mixer via the sub-vacuum flow passage and a portion of the vacuum flow passage between the connection portion and the vacuum actuator when the switchable valve assembly is in the open position and the closed position,
   wherein the switchable valve assembly is biased toward the open position so that the switchable valve assembly is in the open position when a vacuum from the crank chamber through the vacuum flow passage at the switchable valve assembly is less than a predetermined vacuum, and so that the switchable valve assembly is moved to the closed position by the vacuum from the crank chamber through the vacuum flow passage when the vacuum from the crank chamber through the vacuum flow passage at the switchable valve assembly exceeds the predetermined vacuum,
   wherein the vacuum flow passage, the sub-vacuum flow passage, and the fuel mixer are formed so that during starting of the gas engine, the vacuum from the crank chamber through the vacuum flow passage at the switchable valve assembly is less than the predetermined vacuum so that during starting of the gas engine, the switchable valve assembly is maintained in the open position and the fuel shut-off valve assembly is held in the open position by vacuum that is communicated from the crank chamber to the vacuum actuator through the vacuum flow passage,
   wherein the vacuum flow passage, the sub-vacuum flow passage, and the fuel mixer are also formed so that following starting of the gas engine, when the gas engine reaches a predetermined speed, the vacuum from the crank chamber through the vacuum flow passage at the switchable valve assembly is greater than the predetermined vacuum, so that after starting of the gas engine, the switchable valve assembly is moved to and held in the closed position and the fuel shut-off valve assembly is held open by a vacuum that is communicated from the fuel mixer to the vacuum actuator through the sub-vacuum flow passage and the portion of the vacuum flow passage between the connection portion and the vacuum actuator.

2. The system of claim 1, wherein the predetermined vacuum is set at a value wherein a difference between the vacuum from the crank chamber through the vacuum flow passage exceeds the vacuum from the fuel mixer through the sub-vacuum passage by a predetermined value.

* * * * *